(No Model.)
F. W. & E. P. PARSONS.
CLAMPING OR SECURING DEVICE.
No. 555,879. Patented Mar. 3, 1896.
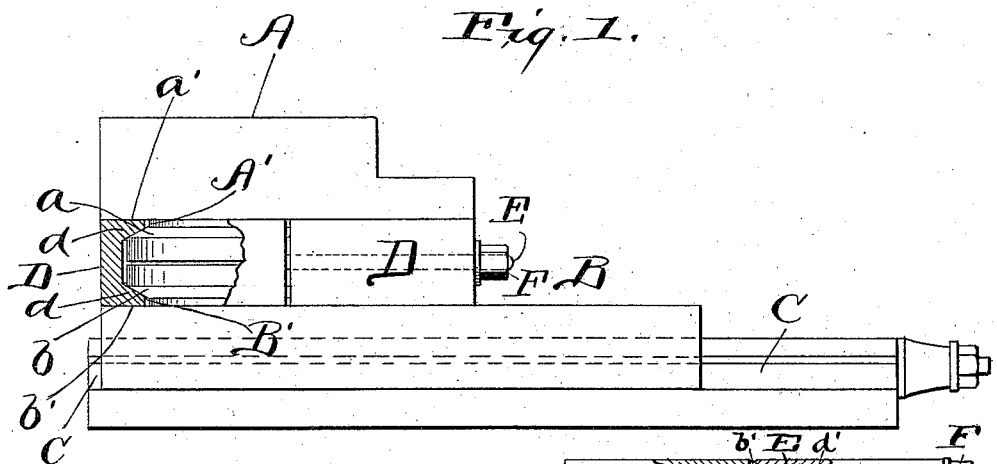
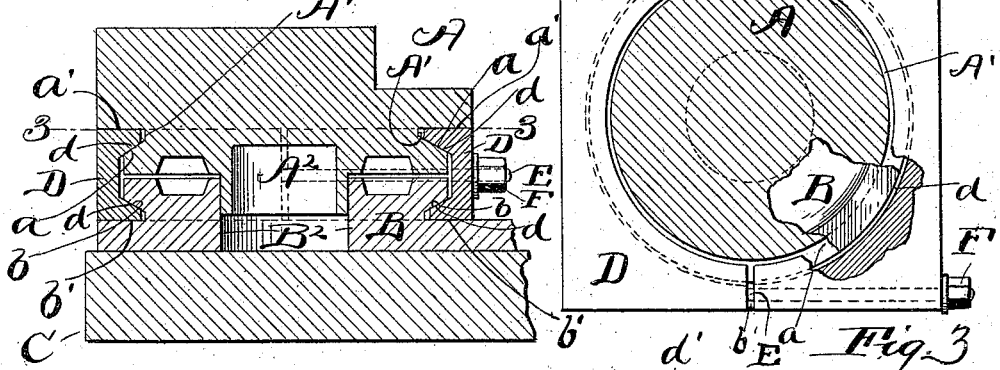
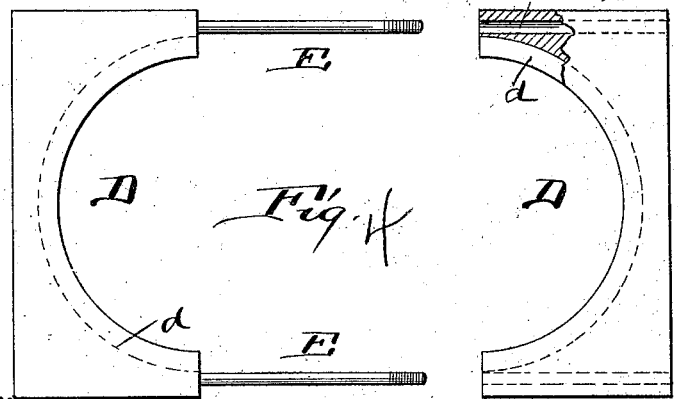
Witnesses:
E. B. Gilchrist
Inventors
Frederick W. Parsons
Ernest P. Parsons
By M. D. Leggett & Co.
their Attorneys

UNITED STATES PATENT OFFICE.

FREDERICK W. PARSONS AND ERNEST P. PARSONS, OF CLEVELAND, OHIO, ASSIGNORS OF ONE-THIRD TO ARTHUR H. PARSONS, OF SAME PLACE.

CLAMPING OR SECURING DEVICE.

SPECIFICATION forming part of Letters Patent No. 555,879, dated March 3, 1896.

Application filed May 9, 1895. Serial No. 548,674. (No model.)

*To all whom it may concern:*

Be it known that we, FREDERICK W. PARSONS and ERNEST P. PARSONS, of Cleveland, in the county of Cuyahoga and State of Ohio, have invented certain new and useful Improvements in Clamping or Securing Devices; and we do hereby declare the following to be a full, clear, and exact description of the invention, such as will enable others skilled in the art to which it pertains to make and use the same.

Our invention relates to improvements in clamping or securing devices more especially designed for securing the pivoted or turnable plate or block that bears the chuck or cutting or working tool or tools in a lathe, planer, or shaper in the desired adjustment.

In the accompanying drawings, Figure 1 is a side elevation, partly in section, showing a turnable plate or block and our improved clamping or securing device for securing said block or plate in the desired adjustment. Fig. 2 is a vertical section of the same. Fig. 3 is a top plan, partly in section, on line 3 3, Fig. 2, with portions broken away. Fig. 4 shows clamp-sections D detached, with one of said members partly in section.

Referring to the drawings, A designates the turnable plate or block that is adapted to turn upon a slide B. C designates a slide-way for said slide.

If plate or block A were employed in a planer or shaper for bearing the cutting or working tool or tools, said block or plate and the member to which it is adjustably secured would, of course, be vertically arranged, but if the same were employed for bearing a chuck it would be horizontally arranged, as in the case illustrated. What members said block or plate carries or what function it performs is immaterial so far as our present invention is concerned, because the latter involves broadly a turnable plate or block for any purpose, secured in the desired adjustment by my improved clamping or securing means.

Plate or block A upon the side adjacent to slide or member B, to which it is adjustably secured, is provided with an annular sloping surface $a$ arranged concentric with the axis of the plate or block and having a trend outwardly toward member B. The sloping annular surface $a$ is preferably formed by providing plate or block A with an annular groove or recess A' and shaping that side wall of the groove or recess that faces in the direction of the face of plate or block A so as to slope outwardly and away from the opposing wall $a'$ of the recess and form sloping surface $a$.

Member B, upon the side that faces in the direction of plate or block A and adjacent to that portion of said block or plate that bears the sloping surface $a$, is provided with an annular sloping surface $b$ arranged concentrically with the axis of the aforesaid plate or block and having a trend outwardly in the direction of said block or plate.

Sloping surface $b$ is preferably made by enlarging the portion of member B to which plate or block A is secured in the direction of member A and providing said enlarged portion of member B with an annular groove or recess B' and shaping that side wall of the recess that faces in the direction of member B so as to slope outwardly and away from the opposing side wall $b'$ of the recess and form the sloping surface $b$. Sloping surfaces $a$ and $b$, therefore, converge toward their outer extremities, as shown in Fig. 2, and the arrangement and construction of parts are preferably such that said sloping surfaces shall have the same diameter. The portions of members A and B between sloping surfaces $a$ and $b$ are preferably circular, as shown in Figs. 3 and 4.

Plate or block A, in order to prevent axial displacement of the same, is preferably provided upon the side adjacent to member B with a lug $A^2$ that engages a corresponding hole $B^2$ formed in said member B.

A clamp consisting of two sections D D is provided for securely clamping plate or block A to member B in the desired adjustment of said block or plate. Said clamp-sections are constructed or shaped to render them capable of embracing opposite sides, respectively, of those portions of members A and B that have the sloping surfaces $a$ and $b$, and to this end said clamp-sections, upon their opposing sides, are provided, respectively, with two semicircular wedge-shaped members $d$, whose opposing sides are shaped so as to diverge toward their outer extremities and have such trend, and are located such a distance apart that the wedge-shaped members of the clamp-sections, when the latter are assembled upon members A and B, shall be adapted to enter recesses A' and B' formed in said members A and B, respectively, and capable of being brought into frictional engagement with the side walls of said recess. Any suitable means for locking or securing the clamp-sections in their operative position is provided, and the means preferably employed for the purpose consists of studs E and nuts F. The studs are rigidly secured to one of the clamp-sections and are adapted to extend easily through corresponding holes $d'$ in the companion clamp-section, and the nuts are mounted upon the screw-threaded ends of said studs at the outer side of the stud-penetrated clamp-section, and the clamp-sections are secured in their operative position upon the assemblage of the parts by tightening up the aforesaid nuts.

What we claim is—

1. The combination with a turnable plate or block A and the member upon which said block or plate is supported, of a clamping device engaging the movable block or plate on all sides and adapted to clamp said plate or block to the supporting member, and suitable means for locking or securing the clamping device in its operative position, substantially as set forth.

2. The combination with the turnable plate or block A and the member from which said plate or block is supported, each of said members being recessed to form a sloping surface, and the sloping surfaces of the two members converging toward their outer extremities, of a clamping device having wedge-shaped members adapted to engage the aforesaid recesses and sloping surfaces and clamp the movable block or plate to the supporting member, and suitable means for locking or securing the clamping device in its operative position, substantially as set forth.

3. The combination with the turnable plate or block A and the member from which said block or plate is supported, each of said members being provided with an annular recess arranged concentric with the axis of the plate or block, each recess having a sloping side wall, and the two sloping walls converging toward their outer extremities, of a clamping device comprising wedge-shaped members adapted to engage the aforesaid recesses and sloping surfaces and clamp the movable block or plate to the supporting member, and suitable means for locking or securing the clamping device in its operative position, substantially as set forth.

4. The combination with the turnable plate or block A and the member from which said block or plate is supported, each of said members being provided with an annular recess arranged concentric with the axis of the plate or block, each recess having a sloping side wall and two sloping walls converging toward their outer extremities, of a clamping device comprising two sections adapted to engage opposite sides, respectively, of the recessed portions of the aforesaid members, each clamp-section being provided with two wedge-shaped members the one whereof is adapted to frictionally engage the sloping surface of the supporting member, and suitable means for locking or securing the clamp-sections in their operative position, substantially as set forth.

5. A clamping device consisting of two sections adapted to engage opposite sides, respectively, of the members to be clamped together, each clamp-section, upon its working face, being provided with two wedge-shaped members located a suitable distance apart substantially as indicated, one of the clamp-sections being provided with two holes $d'$ extending through said section, at opposite ends, respectively, of the wedge-shaped members of the section, and the other clamp-section having screw-threaded studs adapted to extend through the aforesaid holes, and nuts for engaging the screw-threaded ends of the studs and securing the clamp-sections in their working position, substantially as set forth.

In testimony whereof we sign this specification, in the presence of two witnesses, this 23d day of April, 1895.

FREDERICK W. PARSONS.
ERNEST P. PARSONS.

Witnesses:
C. H. DORER,
L. WARD HOOVER.